Aug. 22, 1961     R. NOLET     2,996,829
ANIMAL TRAP
Filed Sept. 14, 1959

INVENTOR
Richard NOLET
BY
Pierre Lespérance
PATENT AGENT

3 Claims. (Cl. 43—88)

The present invention relates to animal traps of the type used by hunters for capturing wild animals and which comprises jaws which are adapted to spring into closing and gripping position upon contact of a release member by the animal.

Traps of this kind are made in different sizes for capturing different species of animals.

The main object of the present invention is the provision of an animal trap of the character described which consists of a pair of pivoted U-shaped claws adapted to take a closed position in opposed abutting relation in which the means for forcibly closing the claws are so arranged as to apply equal forces on both side legs of each claw, thereby obtaining a quick closing movement of the claws and also uniform clamping pressure at all parts of the abutting claws to thereby positively prevent escape of the animal.

Another important object of the present invention is the provision of spring means for actuating and closing the claws in an animal trap of the character described which are of strong, simple and failure proof construction.

Yet another important object of the present invention is the provision of simple and efficient means for locking the claws in opened position and which are yet very sensitive to animal contact whereby they release the claws for clamping movement upon only slight pressure on the releasing plate.

Yet another important object of the present invention is the provision of a trap of the character described in which there exist a high ratio between the clamping force exerted by the claws in gripping position and the force required for releasing the opened claws.

The foregoing and other important objects of the present invention will become more apparent during the following disclosure and by referring to the drawings, in which.

In the drawings, like reference characters indicate like elements throughout.

Figure 1:
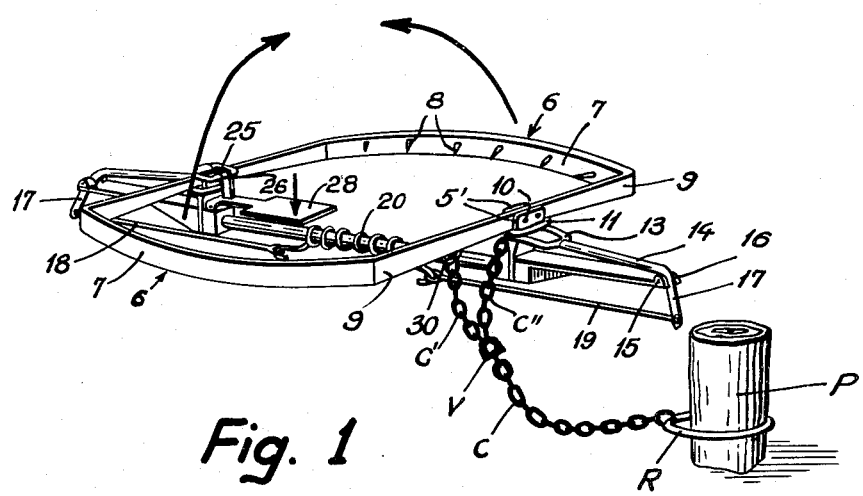
FIGURE 1 is a perspective view of the trap in opened position.

The trap of the present invention comprises a frame constituted by a central tubular element 1 made of a tube or solid rod and at both ends of which are secured brackets 2 which are constituted by square blocks 3 respectively secured directly to the tube 1, and by extensions 4 of generally flat shape. Brackets 2 are alined with tube 1. Upstanding yoke shaped supports 5 are rigidly secured to each block 3 and form pivot points for the claws 6. The claws 6 are constituted by U-shaped members made by flat stock suitably bent to form a convex curved transverse portion 7 provided with gripping teeth 8, and straight side legs 9, the free ends of which are inserted within the ears 5′ of the yokes 5 and pivoted therein by means of pivot pins 10. Thus, the side legs 9 of the two claws are pivoted two by two in each yoke 5, such that the claws can pivot toward and away from each other between an opened position as shown in FIGURE 1, in which the two claws lie in a substantially common horizontal plane to a closed position as shown in FIGURE 2, in which the two claws abut each other along their adjacent edge, with the gripping teeth 8 projecting towards and partly overlying the opposite claw.

Figure 2:
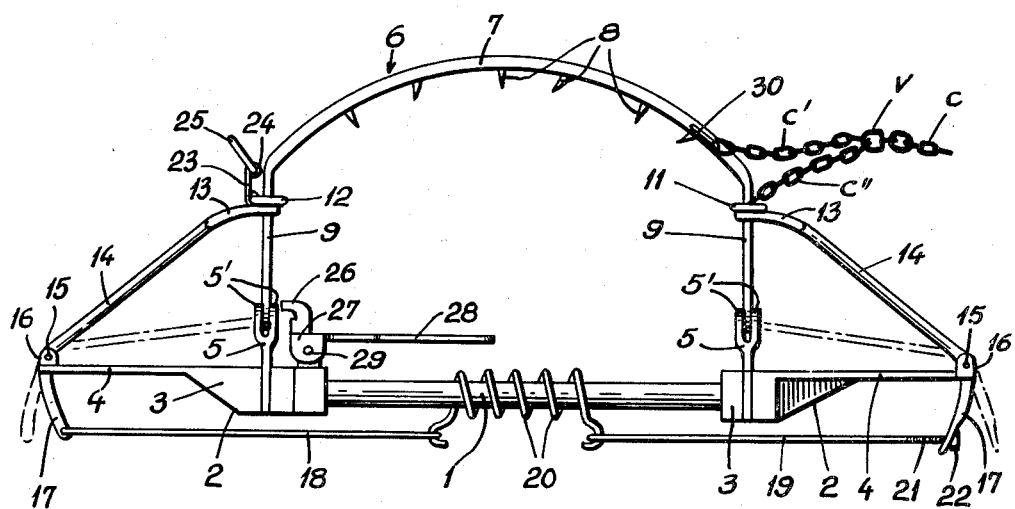
FIGURE 2 is a side elevation of the same in closed position.

The means for forcibly closing the claws in gripping position are constituted by rings 11 and 12 which encircle the side legs 9 of the claws 6 two by two and are adapted to slide up and down along said side legs and over the ears 5′ of the yoke members 5 to take a position below said ears, as shown in FIGURE 1, in order to allow complete opening movement of the claws.

The rings 11 and 12 are engaged by prongs 13 of fork members 14 which extend outwardly over the extensions 4 of the brackets 2 and are pivoted intermediate their ends on pins 15 journaled in ears 16 upstanding at the ends of the extensions 4.

The outer end portions 17 of the fork members 14 are bent downwardly and each have a hole at its free end whereby one fork is connected to a rod 18 and the other fork to a bolt 19. Rod 18 and bolt 19 extend underneath the brackets 2 and their inner curved ends are secured to the opposite ends of a heavy coil spring 20 which is wound around the tube 1 and is capable of longitudinal displacement along the same.

The bolt 19 has a threaded portion 21 and is attached by a nut 22 to the bent portion 17 of the associated fork 14 to thereby enable adjustment of the tension force exerted by spring 20.

It will be understood that when the forks 14 are pressed downwardly towards the brackets 2, the rings 11 and 12 are allowed to slide along the legs 9 of the claws 6 to take a position below the ears 5′ of the yokes 5 whereby the claws can take an opened position. In the down movement of the forks, their outer portions 17 have moved outwardly thereby tensioning the coil spring 20.

The forks 14 are locked in cocked position by the following means. The ring 12 is provided with a right angular web 23 on the outside thereof which forms a sleeve 24 in which are inserted the ends of a loop member 25 which can pivot with respect to the slip ring 12 to take a position overlying the adjacent portions of the side legs 9 of the claws 6 on one side of said claws when the claws are in opened position as shown in FIGURE 1. This is the locking position of the loop 25 which keeps the claws in opened position and is in turn maintained in locking position by having a portion engaged underneath a latching finger 26 mounted on the pivoted portion 27 of a release plate 28. The plate 28 which is pivoted to the block 3 by pin 29 extends horizontally over the tube 1 and part of the coil spring 20. The weight of the release plate 28 contributes to the releasing of the locking loop 25. Thus, only a slight additional downward pressure is required on plate 28 to cause releasing of the loop 25. When said loop is released it no longer offers any resistance against the closing movement of the claws 6. The side legs 9 of said claws, which move towards one another under the action of the heavy coil spring 20, exert an upwardly force against the ends of locking loop 25 and causes outward opening movement of the latter which thus clears the claws.

The claws are moved into clamping position under the action of the forks 14 which pivot upwardly and push the rings 11 and 12 upwardly along the side legs 9 of the claws 6. Because the forks are actuated by a common coil spring 20, a substantially equal upward force is exerted on the two rings 11 and 12 thereby causing fast and smooth closing movement of the claws and equal gripping forces are exerted by said claws, once closed, at substantially all the points of the same.

In practice, the trap is attached to a peg, such as peg P, a tree trunk or the like, by means of a chain C and ring R, the chain being attached at its other end to a clevis V for rotational connection to two short chains C′, C″ respectively connected to one claw 6 by means of eye 30 and to a bracket 2.

The trap of the present invention can be made of compact size; for instance, a trap having an overall length of approximately two feet can be made strong enough for capturing bears. Obviously the size and strength of the various elements constituting the trap will be varied in accordance with the type of animal it is desired to capture.

While a preferred embodiment of the present invention has been illustrated and described, it is understood that various modifications may be resorted to without departing from the spirit and scope of the appended claims.

What I claim is:

1. A trap for capturing animals comprising a frame consisting of a central elongated member and aligned elongated end brackets rigid with said central member, upstanding supports secured to said brackets adjacent said central member, a pair of U-shaped claws mounted side by side and having their side legs pivoted two by two on said supports, rings freely encircling the adjacent pair of legs at each side of said claws whereby movement of said rings along said legs causes closing of said claws, fork members having prongs engaging the sides of said claw legs underneath said rings, extending over said end brackets externally of said claws and pivoted intermediate their ends on the outer ends of said brackets to define end portions protruding under said brackets at an angle thereto, a common coil spring freely wound on said central member and tie rods connecting the ends of said coil spring to said protruding end portions of said fork members whereby said spring is stressed and cocks said fork members in the opened position of said claws, means to lock one of said rings in claw opening position, a release plate for releasing said locking means, and means for anchoring said trap.

2. A trap as claimed in claim 1 wherein one of said tie rods has an adjustable effective length to adjust the tension of said spring on said fork members.

3. A trap as claimed in claim 1 wherein said anchoring means include two chains respectively attached to one of said rings and one of said claws.

References Cited in the file of this patent

UNITED STATES PATENTS

| 764,432 | Mocker | July 5, 1904 |
| 2,457,501 | Shene | Dec. 28, 1948 |
| 2,877,596 | Elencik | Mar. 17, 1959 |

FOREIGN PATENTS

| 24,300 | Australia | June 24, 1930 |
| 25,808 | Australia | Mar. 19, 1931 |